(12) United States Patent
Brouwer et al.

(10) Patent No.: US 9,079,787 B2
(45) Date of Patent: Jul. 14, 2015

(54) PROCESS FOR OBTAINING DESALTED WATER FROM ZIRCONIUM-CONTAINING WASH WATER

(75) Inventors: Jan-Willem Brouwer, Willich (DE); Jens Krömer, Düsseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 490 days.

(21) Appl. No.: 12/535,733

(22) Filed: Aug. 5, 2009

(65) Prior Publication Data

US 2009/0288738 A1 Nov. 26, 2009

Related U.S. Application Data

(63) Continuation of application No. PCT/EP2007/062290, filed on Nov. 13, 2007.

(30) Foreign Application Priority Data

Feb. 5, 2007 (DE) .......................... 10 2007 006 450

(51) Int. Cl.
| | | |
|---|---|---|
| *C02F 1/42* | (2006.01) | |
| *C02F 1/44* | (2006.01) | |
| *C02F 1/52* | (2006.01) | |
| *C02F 1/66* | (2006.01) | |
| *C23C 22/86* | (2006.01) | |
| *B01D 61/04* | (2006.01) | |
| *C02F 1/00* | (2006.01) | |
| *C02F 101/20* | (2006.01) | |
| *C02F 103/16* | (2006.01) | |

(52) U.S. Cl.
CPC . *C02F 1/441* (2013.01); *C02F 1/42* (2013.01); *C02F 1/66* (2013.01); *C23C 22/86* (2013.01); *C02F 2001/007* (2013.01); *C02F 2101/20* (2013.01); *C02F 2103/16* (2013.01)

(58) Field of Classification Search
CPC ........ B01D 61/02; B01D 61/04; B01D 61/12; B01D 2257/60; B01D 2311/12; B01D 2311/18; B01D 15/36; B01D 15/361; B01J 47/00; C02F 1/42; C02F 1/44; C02F 1/441; C02F 1/52; C02F 1/5236; C02F 1/66; C02F 1/58; C02F 1/62; C02F 9/00; C02F 2305/00; C02F 2209/06; C02F 2209/05; C02F 2103/16; C02F 2103/34; C02F 2101/20

See application file for complete search history.

(56) References Cited

U.S. PATENT DOCUMENTS

| | | | | |
|---|---|---|---|---|
| 4,814,091 A | * | 3/1989 | Napier et al. ................. | 210/665 |
| 5,087,373 A | * | 2/1992 | Kolberg et al. ............... | 210/665 |
| 2005/0098499 A1 | * | 5/2005 | Hussain ........................ | 210/639 |

FOREIGN PATENT DOCUMENTS

| | | |
|---|---|---|
| DE | 19733972 A1 | 2/1999 |
| DE | 10341232 A1 | 3/2005 |
| EP | 0461686 A | 12/1991 |
| WO | 2004063424 A2 | 7/2004 |

OTHER PUBLICATIONS

Euler et al. Determination of Ksp, G, H, and S for the dissolution of calcium hydroxide in water. J. Chem. Ed., vol. 77, No. 8 (2000) p. 1-9.*
International Search Report dated Feb. 27, 2008, International Application PCT/EP2007/062290 All references cited in the International Search Report are listed above.

* cited by examiner

*Primary Examiner* — Katherine Zalasky
(74) *Attorney, Agent, or Firm* — Mary K. Cameron

(57) ABSTRACT

A method for recovering demineralized water from zirconium-containing rinse water having a pH lower than 6.0, wherein a) the rinse water has added to it an aqueous solution of $Ca(OH)_2$ containing no more than 0.1 wt % undissolved $Ca(OH)_2$, in a quantity such that the pH of the rinse water rises to a value in the range from 6.2 to 8.0, b) a precipitate that forms is separated from the rinse water, and c) the rinse water from which the precipitate was removed in step b) is subjected to an ion exchange method or to reverse osmosis.

17 Claims, No Drawings

PROCESS FOR OBTAINING DESALTED WATER FROM ZIRCONIUM-CONTAINING WASH WATER

CROSS-REFERENCE TO RELATED CASES

This application is a continuation under 35 U.S.C. Sections 365(c) and 120 of International Application No. PCT/EP2007/062290, filed Nov. 13, 2007 and published on Aug. 14, 2008 as WO 2008/095555, which claims priority from German Patent Application No. 102007006450.2 filed Feb. 5, 2007, which are incorporated herein by reference in their entirety.

FIELD OF THE INVENTION

The subject matter of the present invention is a method for recovering demineralized water from zirconium-containing rinse water having a pH lower than 6.0

BACKGROUND OF THE INVENTION

In layer-forming phosphating of metals for corrosion protection, rinsing is often performed after phosphating, using aqueous solutions that contain complex zirconium fluorides. This so-called "post-treatment rinse" or "post-passivation" improves the corrosion protection produced by the phosphate layer. After this post-passivation step, the metal surfaces treated in this fashion are rinsed with water. This produces zirconium-containing rinse water that was hitherto sent on for wastewater treatment.

Rinse water from phosphating processes, which contains heavy metals and, in the context of corresponding post-passivation, zirconium as well, is usually treated by adding a suspension of calcium hydroxide ("lime water"). The concentration of partly dissolved, but predominantly undissolved suspended calcium hydroxide in these suspensions is usually in the region of 10 wt %. The pH of the rinse water rises in this context into a range from approximately 9 to approximately 11. Heavy-metal and zirconium ions dissolved in the rinse water thereby precipitate as hydroxides and phosphates, and are separated out, together with excess calcium hydroxide, as a slurry. Because of the excess of dissolved calcium ions and of $OH^-$ ions, the conductivity of the wastewater pretreated in this fashion is usually approximately 1000 to approximately 10,000 $\mu S/cm$. After this pretreatment, and after neutralization if necessary, the rinse water is sent on to the wastewater treatment plant. Rinse water is thus discharged from the water circulation system of the phosphating facility, and generates disposal costs. The water circulation must be correspondingly topped up with fresh water, which also entails costs. Because of the high ion load (reflected in the high conductivity) of the rinse water after lime water precipitation, it is not economical to use, for example, ion exchange or reverse osmosis to produce softened or demineralized water that can be reused in the water circulation system of the phosphating facility. The object of the present invention is to make available a method with which zirconium-containing rinse water can be processed in such a way that it can be reused in the phosphating process as rinse water.

SUMMARY OF THE INVENTION

The subject matter of the present invention is a method for recovering demineralized water from zirconium-containing rinse water having a pH lower than 6.0, wherein a) the rinse water has added to it an aqueous solution of $Ca(OH)_2$ containing no more than 0.1 wt % undissolved $Ca(OH)_2$, in a quantity such that the pH of the rinse water rises to a value in the range from 6.2 to 8.0, b) a precipitate that forms is separated from the rinse water, and c) the rinse water from which the precipitate was removed in step b) is subjected to an ion exchange method or to reverse osmosis.

In one embodiment, the rinse water has added to it in step a) a quantity of aqueous solution of $Ca(OH)_2$ such that said water exhibits an electrical conductivity of no more than 200 $\mu S/cm$, by preference no more than 100 $\mu S/cm$.

In any of the afore-described embodiments, optionally, the aqueous solution of $Ca(OH)_2$ in step a) contains 0.01 to 0.14 wt % $Ca(OH)_2$.

In any of the afore-described embodiments, optionally, the rinse water is a rinse water that occurs upon rinsing of metal surfaces that have been treated, after phosphating, with a zirconium-containing passivating solution.

In any of the afore-described embodiments, optionally, prior to step a), the rinse water exhibits a zirconium concentration in the range from 0.5 to 20 mg/l.

In any of the afore-described embodiments, optionally, the demineralized water obtained in step c) is used for the preparation of process solutions, or for the rinsing of metal surfaces in the course of a method for conversion treatment.

DETAILED DESCRIPTION OF EMBODIMENTS OF THE INVENTION

Zirconium-containing treatment, e.g. post-treatment rinse or post-passivation rinse, solutions typically applied following phosphating are weakly acid. If water is used, after post-passivation, to rinse off zirconium-containing treatments that still adhere to the metal surface, e.g. the post-passivation solution, the rinse water thus obtained has a pH lower than 6.0. In the method according to the present invention, what is added to this rinse water is not, as in the existing art, lime water (which contains a large quantity of undissolved calcium hydroxide), but rather an aqueous solution of calcium hydroxide that contains no more than 0.1 wt % undissolved $Ca(OH)_2$. This aqueous solution by preference contains no undissolved $Ca(OH)_2$ at all, and its visual appearance is thus completely clear. The $Ca(OH)_2$ content of the aqueous solution is by preference in the range from 0.2 to 0.01 wt %.

According to the present invention, the quantity of an aqueous solution of $Ca(OH)_2$ added to the zirconium-containing rinse water is merely such that the pH of the rinse water rises only to a value in the range from 6.2 to 8.0, in particular to a value in the range from 6.5 to 7.5. A pH from approximately 9 to approximately 11, as is usual with conventional lime water precipitation according to the existing art, is thus avoided according to the present invention. It has been found that despite this low pH in the range from 6.2 to 8.0, and the correspondingly small added quantity of calcium hydroxide, the zirconium ions of the rinse water largely precipitate out in a precipitate that forms. This precipitate that forms is separated from the rinse water. This is possible using conventional techniques such as filtration or centrifuging. Bag filters or sand filters, for example, can be used for this. The rinse water, from which the zirconium-containing precipitate has been eliminated in this fashion, can then be subjected to a method known per se that yields largely softened or demineralized water. This can be an ion exchange method or a reverse osmosis process, which are known as such in the existing art of demineralizing water.

Conversely, without the separation according to the present invention of zirconium ions from the rinse water, it is not possible to produce demineralized water from the untreated zirconium-containing rinse water using ion exchange methods or reverse osmosis. It can be done in the short term, but it has been found that with a zirconium concentration in the untreated rinse water on the order of approximately 2 to 10 mg/l, ion exchange resins or reverse osmosis membranes quickly become clogged. This can be attributed to the formation of zirconium-containing precipitates as the zirconium ions become concentrated. After treatment according to the present invention, the rinse water from which zirconium ions have been removed still has a zirconium content of less than 0.1 mg/l. In the context of further demineralization of this rinse water using ion exchange methods or reverse osmosis, no clogging was observed over service lives of practical relevance.

In step a), addition of the $Ca(OH)_2$ solution is preferably controlled so that a pH of 7.0 is reached if at all possible. This can be controlled automatically by way of a measuring and metering unit that contains a pH electrode. Manual control of the method is thus not necessary; this increases cost-effectiveness. Experiments have shown that up to the point when the desired pH is reached, the quantity of aqueous solution of $Ca(OH)_2$ that must be added is only such that the rinse water exhibits an electrical conductivity of no more than 200 µS/cm, or indeed no more than 100 µS/cm. These low conductivity values indicate a low ion concentration, so that the aforesaid demineralization methods can be used cost-effectively.

It is preferable to use, in the method according to the present invention, an aqueous solution of $Ca(OH)_2$ that contains 0.01 to 0.14 wt %, in particular 0.05 to 0.12 wt %, $Ca(OH)_2$. These concentrations are particularly favorable for maintaining, in the context of pH-controlled automatic metering, the limit values for pH and electrical conductivity that are desirable according to the present invention.

The process in which the zirconium-containing rinse water to be treated has occurred, i.e. been produced, is in principle of no consequence for the method according to the present invention. The method according to the present invention was developed and tested for rinse water that occurred in the context of phosphating of metal surfaces and post-passivation using zirconium-containing post-passivation solutions. The method according to the present invention is therefore preferably characterized in that the rinse water is a rinse water that occurs upon rinsing of metal surfaces that were treated, after a phosphating action, with a zirconium-containing passivating solution. It is characteristic of such rinse water that before the treatment according to the present invention, it exhibits a zirconium concentration in the range from 0.5 to 20 mg/l, and in particular in the range from 1 to 10 mg/l. Before the treatment according to the present invention, the rinse water can exhibit, for example, a zirconium content in the region of 2 mg/l.

The economic value of the present invention lies in the fact that zirconium-containing rinse water does not, as previously, need to be transferred out of the process and disposed of, but instead can be processed into demineralized water and reused in the production process. It is therefore particularly cost-effective to use the demineralized water obtained in step c) for the preparation of process solutions or for rinsing metal surfaces in the course of a method for conversion treatment, in particular for phosphating.

The advantage of the present invention is therefore that less wastewater is transferred out of processes for metal surface treatment, and correspondingly less fresh water needs to be introduced. This reduces resource use and increases cost-effectiveness.

EXAMPLES

A test was first made as to whether the rinse water that occurs in practical use, after post-passivation of phosphated metal surfaces by zirconium-containing passivation, could be demineralized without further treatment using ion exchangers. A whitish coloration occurred in this context on the anion exchanger resin, however, indicating the formation of zirconium-containing precipitates. This would probably result, after a short service life, in clogging of the anion exchange column. Based on this observation, an attempt was then made to reduce the zirconium content of the rinse water by pretreating it. The dissolved-ion content in the rinse water after the intended pretreatment was desired, however, to remain so low that the conductivity of the rinse water did not exceed a value of 200 µS/cm, in particular 100 µS/cm. The intent of this was to enable cost-effective further demineralization.

In the further experiments, a real-world rinse water was used that had occurred after phosphating and subsequent post-passivation using a zirconium-containing post-passivation solution. This rinse water had a pH of 4.0, a conductivity of 48 µS/cm, and a zirconium content of 2.0 mg/l. In a comparative experiment, this rinse water had a 10% Na(OH) solution added to it in a quantity such that the pH rose to 7.1. The rinse water then had a conductivity of 153 µS/cm. The zirconium content remained unchanged. This comparative experiment shows that simply raising the pH into the neutral region is not sufficient to precipitate zirconium ions out of the rinse water.

In an experiment in accordance with the method according to the present invention, the original rinse water had added to it a quantity of a 0.1% solution of $Ca(OH)_2$ such that the pH rose to 7.0. The rinse water then had a conductivity of 86 µS/cm. After the resulting precipitate had been filtered off through a Blauband filter, the rinse water still had a zirconium content of less than 0.1 mg/l. It was possible to further demineralized this pretreated rinse water without difficulty by ion exchange, with no observation of a whitish discoloration of the anion exchanger after service lives of practical relevance.

In a further comparative example, the rinse water had a 10% suspension of $Ca(OH)_2$ added to it in accordance with the existing art. Addition was stopped once a pH of 7 had been reached. At this point in time, however, the solution equilibrium of the suspension had not yet been re-established. The pH had instead risen over time, even without the addition of further $Ca(OH)_2$ suspension, to 10.4, which can be explained by further dissolution of suspended $Ca(OH)_2$. Once any precipitate that had been formed had been filtered off along with the undissolved $Ca(OH)_2$, the rinse water once again had a zirconium content of less than 0.1 mg/l, but the conductivity was 298 µS/cm. The higher conductivity as compared with the method according to the present invention, which indicates a higher content of dissolved ions, makes further demineralization of this rinse water by ion exchange or reverse osmosis less cost-effective.

What is claimed is:

1. A method for recovering demineralized water from zirconium-containing rinse water having a pH lower than 6.0, comprising steps of:
   a) treating zirconium-containing rinse water having a pH lower than 6.0 and zirconium present in an amount of 2-10 mg/l by adding an aqueous solution of $Ca(OH)_2$ containing no more than 0.1 wt. % undissolved $Ca(OH)_2$ in a quantity such that pH of treated rinse water rises only to a value in a range from 6.2 to 7.5 and a precipitate forms;

b) separating the precipitate from the treated rinse water, and c) subjecting the treated rinse water from which the precipitate was removed in step b) to an ion exchange method or to reverse osmosis thereby producing demineralized water;

wherein the treated rinse water from step a) exhibits an electrical conductivity of no more than 200 µS/cm.

2. The method according to claim 1, wherein the aqueous solution of $Ca(OH)_2$ in step a) contains 0.01 to 0.14 wt. % $Ca(OH)_2$.

3. The method according to claim 1, wherein the rinse water being treated results from rinsing of metal surfaces that have been passivated, after phosphating, with a zirconium-containing passivating solution.

4. The method according to claim 1, wherein prior to step a), the rinse water exhibits a zirconium concentration in a range from 0.5 to 10 mg/l, the aqueous solution of $Ca(OH)_2$ added in step a) contains no undissolved $Ca(OH)_2$, and the pH of the treated rinse water rises only to a value in a range from 6.2 to 7.0.

5. The method according to claim 1, further comprising the additional step of re-using said demineralized water.

6. The method according to claim 5, wherein said demineralized water is re-used in a method for conversion treatment.

7. The method according to claim 1, wherein the quantity of aqueous solution of $Ca(OH)_2$ added to the rinse water in step a) is such that after step b) said treated rinse water exhibits an electrical conductivity of no more than 200 µS/cm and zirconium concentration of the treated rinse water is less than 0.1 mg/l.

8. The method according to claim 1, wherein the rinse water being treated results from a method including rinsing of metal surfaces that have been passivated, after phosphating, with a zirconium-containing passivating solution; and the demineralized water is re-used in said process.

9. The method according to claim 1, wherein in step a), the aqueous solution of $Ca(OH)_2$ has a concentration of $Ca(OH)_2$ of 0.1% to 0.14 wt % and the pH of treated rinse water rises to a value in a range from 6.2 to 7.0.

10. The method according to claim 1, further comprising, in step a) automatically controlling the addition of the aqueous solution of $Ca(OH)_2$ added to the rinse water with a measuring and metering unit that contains a pH electrode thereby maintaining a pH of 7 and such that said treated rinse water exhibits an electrical conductivity of no more than 100 µS/cm.

11. The method according to claim 1, wherein the quantity of aqueous solution of $Ca(OH)_2$ added to the rinse water in step a) is such that said treated rinse water exhibits an electrical conductivity of no more than 100 µS/cm.

12. A method for recovering demineralized water from zirconium-containing rinse water, comprising steps of:

a) treating zirconium-containing rinse water having a pH lower than 6.0 and zirconium present in an amount of 2-10 mg/l, by adding an aqueous solution of $Ca(OH)_2$, containing no undissolved $Ca(OH)_2$, in a quantity such that pH of treated rinse water rises only to a value in a range from 6.2 to 7.5, the treated rinse water exhibits an electrical conductivity of no more than 100 µS/cm, and a zirconium-containing precipitate forms;

b) separating the zirconium-containing precipitate from the treated rinse water to form a zirconium-containing pretreated rinse water having a zirconium content less than that of the zirconium-containing rinse water, and c) subjecting the pretreated rinse water to ion exchange using ion exchange resins or reverse osmosis using reverse osmosis membranes thereby producing demineralized water;

wherein prior to step c) said zirconium-containing pretreated rinse water has a zirconium content of less than 0.1 mg such that no clogging of the ion exchange resins or the reverse osmosis membranes is observed.

13. A method for conversion treatment comprising steps of:

a) contacting a metal surface with a zirconium-containing treatment solution;

b) rinsing the metal surface with water thereby generating zirconium-containing rinse water having a pH lower than 6.0;

c) treating zirconium-containing rinse water having a pH lower than 6.0 and zirconium present in an amount of 2-10 mg/l by adding an aqueous solution of $Ca(OH)_2$ containing no more than 0.1 wt. % undissolved $Ca(OH)_2$ in a quantity such that pH of treated rinse water rises to a value in a range from 6.2 to 7.5 and a precipitate forms;

d) separating the precipitate from the treated rinse water, and e) subjecting the treated rinse water from which the precipitate was removed in step d) to an ion exchange method or to reverse osmosis;

f) re-using the treated rinse water from step e) in preparing process solutions or for rinsing metal surfaces in the method for conversion treatment wherein the treated rinse water from step c) exhibits an electrical conductivity of no more than 200 µS/cm.

14. The method according to claim 13, wherein the rinse water being treated results from rinsing of metal surfaces that have been treated, after phosphating, with a zirconium-containing passivating solution.

15. The method according to claim 13, wherein the aqueous solution of $Ca(OH)_2$ in step c) contains 0.01 to 0.14 wt. % $Ca(OH)_2$.

16. The method according to claim 13, wherein the quantity of aqueous solution of $Ca(OH)_2$ added to the rinse water in step c) is such that said treated rinse water exhibits an electrical conductivity of no more than 100 µS/cm.

17. The method according to claim 13, wherein the quantity of aqueous solution of $Ca(OH)_2$ added to the rinse water in step c) is such that after step d) said treated rinse water exhibits an electrical conductivity of no more than 200 µS/cm and zirconium concentration of the treated rinse water is less than 0.1 mg/l.

* * * * *